United States Patent [19]
Matsumoto et al.

[11] Patent Number: 5,961,146
[45] Date of Patent: Oct. 5, 1999

[54] SHOCK ABSORBING TYPE STEERING COLUMN ASSEMBLY

[75] Inventors: Sakae Matsumoto, Takasaki; Yuichiro Fukunaga, Yoshioka-machi, both of Japan

[73] Assignee: NSK Ltd., Tokyo, Japan

[21] Appl. No.: 08/782,288

[22] Filed: Jan. 13, 1997

[30]      Foreign Application Priority Data

Jan. 18, 1996  [JP]  Japan ..................................... 8-006852
Apr. 10, 1996  [JP]  Japan ..................................... 8-088412

[51] Int. Cl.⁶ ...................................................... B62D 1/19
[52] U.S. Cl. ............................................ 280/777; 280/775
[58] Field of Search ..................... 280/775, 777, 280/779

[56]                References Cited

U.S. PATENT DOCUMENTS

| | | | |
|---|---|---|---|
| 3,087,584 | 4/1963 | Jackson et al. .............................. | 188/1 |
| 5,562,307 | 10/1996 | Connor .................................... | 280/777 |
| 5,605,352 | 2/1997 | Riefe et al. ............................. | 280/777 |
| 5,609,364 | 3/1997 | Fouquet et al. .......................... | 280/777 |
| 5,706,704 | 1/1998 | Riefe et al. ............................. | 280/777 |
| 5,788,278 | 9/1998 | Thomas et al. .......................... | 280/777 |

FOREIGN PATENT DOCUMENTS

| | | |
|---|---|---|
| 0 662 414 | 7/1995 | European Pat. Off. . |
| 2714649 | 7/1995 | France . |
| 2714650 | 7/1995 | France . |
| 5-75057 | 10/1993 | Japan . |
| 6-16851 | 5/1994 | Japan . |
| 8-295251 | 11/1996 | Japan . |
| 1120799 | 7/1968 | United Kingdom . |
| 2279623 | 1/1995 | United Kingdom . |
| WO95/00383 | 1/1995 | WIPO . |

*Primary Examiner*—Charles T. Jordan
*Assistant Examiner*—Christopher K. Montgomery
*Attorney, Agent, or Firm*—Vorys, Sater, Seymour and Pease LLP

[57]                ABSTRACT

A shock absorbing type steering column assembly includes a first bracket fixed to a steering column at a middle portion thereof, a second bracket formed integrally with the car body for supporting the first bracket, and a connecting device having an energy absorbing member for supporting the first bracket until a predetermined load is applied upon a secondary collision and absorbing a collision energy applied on the steering column and allowing the first bracket to move relative to the second bracket to absorb the shock energy when the predetermined load is applied on the steering column upon a secondary collision. The energy absorbing member includes a metallic wire which has a basic portion and elongated deformable portions extending respectively from the ends of said basic portion toward free ends. Each of the deformable portions has a folded-back portion and a deformable portion extending from the folded-back portion to the free end. The energy absorbing member is retained at the basic portion by one of the first and the second brackets and engaged or engageable with the other of the first and second brackets at the folded-back portion. When the applied load exceeds the predetermined value and the first bracket moves forward relative to the second bracket, the wire is so urged by the first bracket that the folded-back portions are shifted along the deformable portions toward the free ends, thereby absorbing the collision energy.

20 Claims, 12 Drawing Sheets

SHOCK ABSORBING TYPE STEERING COLUMN ASSEMBLY

BACKGROUND OF THE INVENTION

1. Field of the Invention

The present invention relates to a shock absorbing type steering column assembly for preventing the body of a driver from receiving a large impact at the time of a secondary collision by displacing the steering wheel forward.

2. Description of the Prior Art

Upon an automobile collision, subsequent to a so-called primary clash in which the automobile collides with another automobile, a so-called secondary collision in which the driver collides with the steering wheel occurs. In order to minimize the impact on the driver at this secondary collision to protect the driver's life, it is conventionally arranged to use a so-called collapsible steering shaft which is entirely contracted when a strong impact is given and which has a steering wheel fixed to one end thereof, and to employ an impact absorbing type of a steering column through which said steering shaft is passed.

As a shock absorbing type steering column apparatus to be used for such purpose, there is conventionally known, for example, one disclosed in Japanese Utility Model Laid-Open No. 5-75057. This conventionally-known steering column apparatus of a shock or impact absorbing type is structured as shown in FIGS. 19 to 21 of the accompanying drawings.

Referring to FIGS. 19 to 21, a steering column 1 is structured by combining, for example, an outer column with an inner column in a telescopic manner, and when a strong force is applied along the direction of the shaft (the lateral direction in FIG. 19, and the direction perpendicular to the sheet surface in FIG. 20), the entire column is contracted. Inside such steering column 1, the steering shaft 2 is supported as only being free to rotate. A steering wheel is fixed to the rear end portion of the steering shaft 2, at the portion protruding from the opening at the rear end of the steering column 1.

A supporting bracket 3 for supporting the above-mentioned steering column 1 on the car body 30 has a pair of supporting plates 4a, 4b arranged laterally. Then, both supporting plates 4a, 4b laterally sandwich therebetween a raising/lowering bracket 5 which serves as a support bracket and is fixed by welding to the lower surface of the middle portion of said steering column 1 along the width direction (the direction perpendicular to the sheet surface in FIG. 19, and the lateral direction in FIG. 20) of this steering column 1. On both of the right and left side walls of this raising/lowering bracket 5, cut-away portions 6a, 6b are formed as being open on side of the rear end edge thereof (the right end edge in FIG. 19). Also, vertically elongated holes 7a, 7b which serve as through-holes are respectively formed in portions of said supporting plates 4a, 4b which are aligned with these cut-away portions. A tilt adjusting nut 9 is threadably engaged with the tip end of a tilt adjusting bolt 8 serving as a rod-like connecting member which is passed through from one to the other of these elongated holes 7a, 7b and cut-away portions 6a, 6b (from right to left in FIG. 20). This tilt adjusting bolt 8 is arranged to raise and lower along the elongated holes 7a, 7b but is incapable of rotating due to the engagement of a head portion 10 with a side edge of elongated hole 7b.

A gap between the tilt adjusting nut 9 and the head portion 10 can be changed by rotating the tilt adjusting nut 9 by use of an unrepresented tilt adjusting lever. Then, by changing this gap, it is possible to fix the raising/lowering bracket 5 to the supporting bracket 3 an thereby fix the steering column 1, or to release such fixation of the bracket 5 in order to adjust a vertical position of the steering column 1.

Further, on a portion which exists in the middle portion of the tilt adjusting bolt 8 and the inner side of the raising/lowering bracket 5, the rear end portion of an energy absorbing member 11 (the right end portion in FIGS. 19 and 21; the front and rear sides are defined in terms of the moving direction of the automobile) is externally fitted and supported. Then, the front end portion of this energy absorbing member 11 (the left end portion in FIGS. 19 and 21) is fixed by welding to the lower surface of the middle portion of the steering column 1. Therefore, the rear end portion of the energy absorbing member 11 is supported on the car body 30 which is not displaced even at the secondary collision, through the tilt adjusting bolt 8 and the supporting bracket 3, while the front end portion of said energy absorbing member is supported by the steering column 1 which is displaced forward at the secondary collision.

This energy absorbing member 11 is formed to be corrugated, as shown in FIG. 21, by stamping out from one metallic plate having elasticity. Also, a pair of folded-back portions 13a, 13b are laterally provided and attached to a supporting portion 12 which is provided at the rear end portion of this energy absorbing member 11, and round holes 114a, 114b for inserting said tilt bolt 8 therethrough are formed in the respective folded-back portions 13a, 13b. Further, a tongue piece 15 is formed in the front end portion of the energy absorbing member 11, and this tongue piece 15 can be fixed to the lower surface of said steering column 1 by welding.

The conventional steering column apparatus of a shock or impact absorbing type, which is constituted by inserting the energy absorbing member 11 having a configuration as mentioned above between the tilt adjusting bolt 8 and the steering column 1, as shown in FIGS. 19 and 20, is operated as follows. When an impact force for pushing said steering column 1 forward is given by the secondary collision caused by an accidental collision, the energy absorbing member 11 allows said steering column 1 to be displaced forward, while being plastically deformed to be elongated in the longitudinal direction. The impact energy which is propagated from the steering wheel to the steering column 1 is absorbed because of the plastic deformation of the energy absorbing member 11. For this reason, the impact force to be applied on the body of the driver at the time of the secondary collision is mitigated so as to protect the driver.

In the conventional structure shown in FIGS. 19 to 21, there arises no special problem in terms of protection of the driver at the time of the secondary collision. However, a manufacturing cost of the energy absorbing member 11 is increased for the reason (1) described below, and moreover, an assembling process of this energy absorbing member 11 becomes complicated for the following reasons (2) and (3).

(1) The complicated configuration of the energy absorbing member 11 brings about a high manufacturing cost of the press die. Moreover, when this energy absorbing member 11 is stamped out from a steel plate, much scrap material is left, to degrade a yield on the material.

(2) It is necessary to insert at the assembling the tilt adjusting bolt 8 serving as a connecting member through the pair of cut-away portions 6a, 6b, elongated holes 7a, 7b, and round holes 114a, 114b, respectively. Because of this inserting process, a process for aligning the round holes 114a, 114b provided on the energy absorbing member 11 with said cut-away portions 6a, 6b and said elongated holes 7a, 7b becomes complicated.

(3) A welding process for connecting the tongue piece 15 at the front end of the energy absorbing member 11 with the lower surface of the middle portion of the steering column 1 becomes necessary. If such a welding process is conducted when the steering column apparatus of an impact absorbing type is assembled, the assembling process becomes complicated.

Because of the cost increase of the energy absorbing member owing to the above-mentioned reason (1) and a degraded efficiency of the assembling process owing to the above-mentioned reasons (2) and (3), the entire cost of the steering column apparatus of the impact absorbing type which is disclosed in Japanese Utility Model Laid-Open No. 5-75057 is increased.

As a steering column apparatus of a shock absorbing type, apart from that mentioned above, there are ones disclosed in Japanese Utility Model Laid-Open No. 6-16851, for example, and the like. However, these steering column apparatuses have the same problems as mentioned above.

SUMMARY OF THE INVENTION

A steering column apparatus of the shock absorbing type of the present invention has been devised taking such circumstances into consideration.

Like a steering column apparatus of a shock absorbing type as conventionally known, a steering column assembly of the shock absorbing type of the present invention may comprise: a supported bracket which is fixed to a middle portion of a steering column along the width direction of this steering column, a supporting bracket having a pair of supporting plates for sandwiching the supported bracket therebetween and supported by and fixed to the vehicle body for supporting the supported bracket; a cut-away portion formed as being open on the side of the rear end edge of this supported bracket in a portion of the supporting bracket opposite to each of the supporting plates; a through-hole formed in each of the supporting plates; a rod-like connecting member for connecting and supporting the supported bracket to the supporting bracket in a state in which the connecting member is passed through each of these cut-away portions and through-holes, and an energy absorbing member provided between the supporting bracket and the steering column.

Especially, in the steering column assembly of the shock absorbing type according to an embodiment of the present invention, the energy absorbing member is formed by bending a metallic wire and is provided with a basic portion and two deformable portions which are integrally connected to this basic portion. Then, the basic portion is connected to and supported by a portion which is a part of the supported bracket and positioned in front of said connecting member. Also, the deformable portions each has folded-back portion which is formed in a middle portion thereof around the rear face side of the connecting member. The folded-back portions are folded back at the rear side of this connecting member.

Further, if needed, the whole or a part of the metallic wire which constitutes the energy absorbing member is made to have elasticity and to be latched at a part of the supporting bracket as being detachable upon the secondary collision. Then, the energy absorbing member is arranged to be provided between said supporting bracket and the connecting member, so as to elastically support the weight of the steering column.

The steering column assembly according to an embodiment of the present invention constituted as described above is operated in the following manner. Upon the secondary collision, a forward load is given with impact to the steering column from the steering wheel through the steering shaft. Then, this load displaces the whole or a part of the steering column forward. On the other hand, the supporting bracket and the connecting member are not displaced and remain to be supported on the car body. Therefore, said connecting member is displaced backward with respect to the steering column upon the displacement of the steering column (in reality, the connecting member does not move, but the steering column is displaced forward). At the same time, the basic portion of the energy absorbing member is pulled forward by said steering column.

As described above, when the basic portion of the energy absorbing member is pulled forward, the folded-back portions which are formed on the deformable portions of this energy absorbing member are shifted by or drawn against said connecting member so that this energy absorbing member is deformed. That is, upon the forward displacement of said steering column, said folded-back portions are shifted from the parts in which they are originally provided toward the tip ends of the deformable portions. Thus, by deforming said energy absorbing member to shift the folded-back portions toward the tip ends of the deformable portions, it is possible to absorb the shock or impact energy which is applied to the steering wheel from the body of the driver upon the secondary collision. As a result, the impact to be applied on the body of the driver is mitigated so as to protect of the driver.

The operation described above is similar to that of a steering column apparatus of a shock absorbing type according to the prior invention disclosed in Japanese Patent Application No. 7-102567. Especially, in the case of the shock absorbing type steering column apparatus according to one embodiment of the present invention, since the energy absorbing member is formed by bending a metallic wire and the basic portion of this energy absorbing member is connected to and supported by the supported bracket, the welding process for assembling this energy absorbing member at a predetermined portion becomes no longer necessary.

Moreover, when the assembly is arranged to elastically support the weight of the steering column by the elasticity of the energy absorbing member, if need be, it is no longer necessary to separately provide a spring for supporting the weight of the steering wheel at the time of a tilt adjusting process for adjusting the height of the steering wheel. That is, when the supporting force for the supported bracket with respect to the supporting bracket for the tilt adjusting process is lost, the steering column drops to the lower limit position for the adjustment if such condition continues. Since the tilt adjusting process is difficult to carry out in such state, a balancing spring is provided between the portion fixed to the car body and the portion fixed to the steering column in a conventional apparatus, so as to support the weight of this steering column. In the case of the steering column assembly of the shock absorbing type of the present invention, since a metallic wire is used for the energy absorbing member, it is possible to support the weight of the steering column with this energy absorbing member so as to leave such balancing spring out and to reduce the cost further, if needed.

BRIEF DESCRIPTION OF THE PREFERRED EMBODIMENTS

Figure 1:
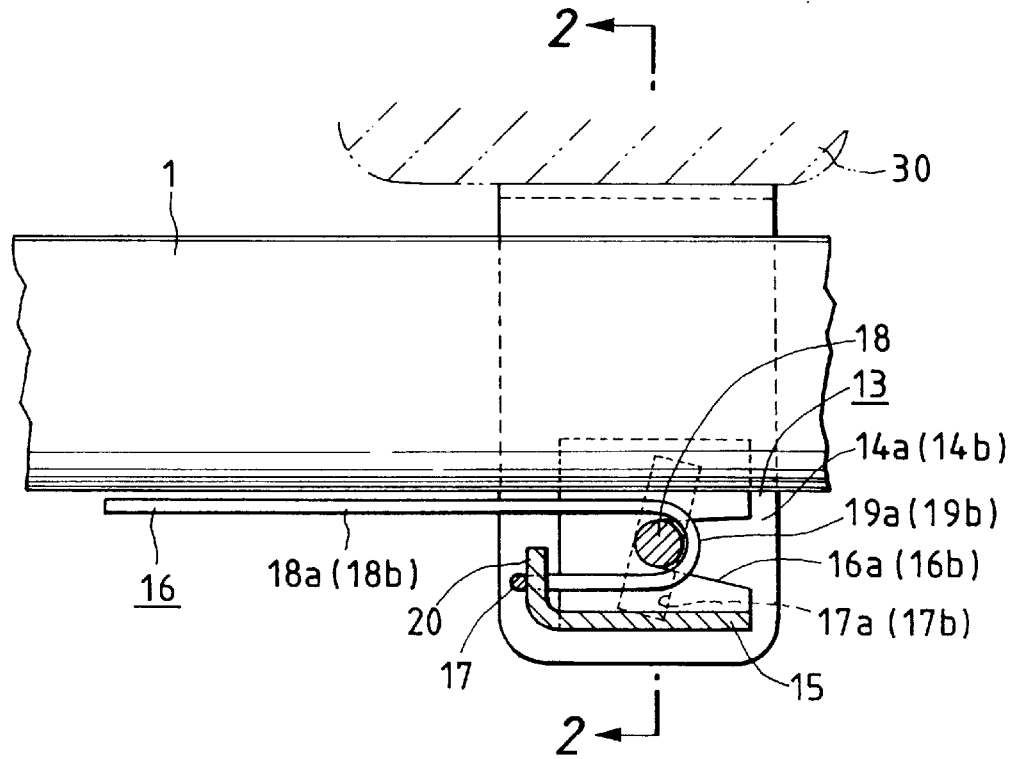
FIG. 1 is a partially cut-away side view for showing in cross-section a main portion of a first embodiment of the present invention.

In all of the embodiments described below, the components denoted by same reference numerals and symbols have the same or similar structures and functions.

Figure 2:
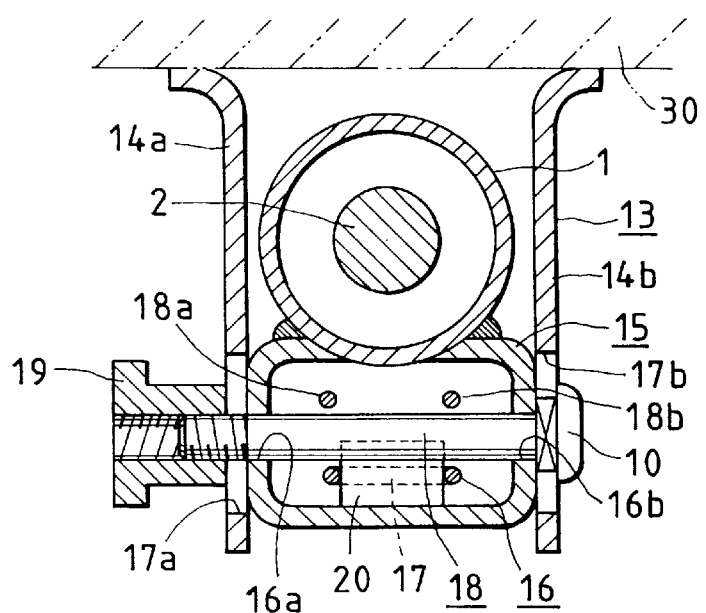
FIG. 2 is a view of said portion taken along 2—2 in FIG. 1.
Figure 3:
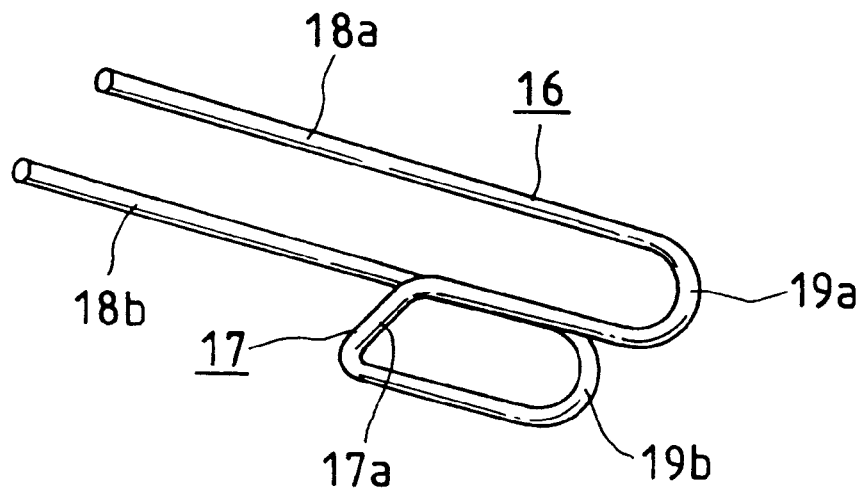
FIG. 3 is a perspective view of an energy absorbing member to be used in the first embodiment.

FIGS. 1 to 3 show the first embodiment of the present invention. A steering column 1 is, when a forward strong impact load is given through a steering wheel and a steering shaft 2 upon a secondary collision, arranged to be freely displaced forward. Note that such structure is conventionally known and not the point of the present invention so that illustration and detailed description thereof will be omitted. In a middle portion of such steering column 1, a raising/lowering bracket 15 which functions as a supported bracket is fixed by welding along the width direction (the perpendicular direction to the sheet plane in FIG. 1, and the lateral direction in FIG. 2) of this steering column 1. On the other hand, a supporting bracket 13 is firmly fixed to a car body 30 in such a manner that the supporting bracket should not be detached from a car body 30 notwithstanding the above-mentioned impact load. This supporting bracket 13 has a pair of supporting plates 14a, 14b for sandwiching the raising/lowering bracket 15 from the both sides thereof.

A pair of cut-away portions 16a, 16b are formed laterally in parts of the raising/lowering bracket 15 opposite to the supporting plates 14a, 14b, as being open on the rear end edge side (the right end edge side in FIG. 1) of this raising/lowering bracket 15. Also, slots 17a, 17b elongated in the vertical direction which are through-holes are formed on the supporting plates 14a, 14b. A tilt adjusting bolt 18 which is a rod-like connecting member is passed through these cut-away portions 16a, 16b and elongated holes 17a, 17b. At the same time, a tilt adjusting nut 19 is threadably engaged with the tip end (the left end portion in FIG. 2) of this tilt adjusting bolt 18 so that the raising/lowering bracket 15 is connected to and supported by the supporting bracket 13. The tilt adjusting bolt 18 is arranged to be passed through the slots 17a, 17b, and is capable of being raised and lowered when the tilt adjusting nut 19 is loosened, but is incapable of rotating due to engagement of a head portion 10 with a side edge of the elongated hole or slot 17b.

Then, an energy absorbing member 16, which is a feature of the present invention, is provided between the supporting bracket 13 and the steering column 1. In the illustrated embodiment, this energy absorbing member 16 is provided between the tilt adjusting bolt 18, which is supported by the supporting bracket 13 at both ends thereof so as not to move in the back and forth direction (the lateral direction in FIG. 1, and the perpendicular direction to the sheet plane in FIG. 2) in spite of an impact load at the time of the secondary collision and the raising/lowering bracket 15, which is displaced together with the steering column 1 forward (to the left in FIG. 1) upon the secondary collision.

The above-mentioned energy absorbing member 16 which constitutes part of a steering column assembly of a shock absorbing type of this embodiment is formed in a shape as shown in FIG. 3, by bending a plastically deformable metallic wire. This energy absorbing member 16 is provided with a basic portion 17 formed at the center thereof and a pair of right and left deformable portions 18a, 18b which are integrally connected to or integrally extended from this basic portion 17. The basic portion 17 is formed in a U-shape by bending at substantially right angles both ends of a central linear portion 17x backward. Also, the deformable portions 18a, 18b are provided with semi-arch folded-back portions 19a, 19b, respectively, at middle portions thereof in a direction substantially perpendicular to the extending direction of the central linear portion 17x. As a result, each of the deformable portions is formed in a J-shape as a whole.

In order to mount the energy absorbing member 16 as described above, a latching plate 20 is bent upward at the front end (the left end in FIG. 1) of the raising/lowering bracket 15. When the steering column of the impact absorbing type is assembled, the central linear portion 17x of the U-shaped basic portion 17 of said energy absorbing member 16 is latched from the inside thereof on the front face side of this latching plate 20. The deformable portions 18a, 18b of this energy absorbing member 16 are folded back at the rear of the tilt adjusting bolt 18 so that the folded-back portions 19a, 19b formed in the midway are provided on the periphery of the rear face side of the middle portion of the tilt bolt 18 (the right face side in FIG. 1).

The front end of the energy absorbing member 16, that is, the end portions opposite to the folded-back portions 19a, 19b of the deformable portions 18a, 18b may be positioned by some means, but are arranged to be free in the form shown.

The shock absorbing type steering column assembly of the present invention structured as described above is operated in the following manner to protect the driver in the case of an accidental collision. At the secondary collision, a forward load (to the left in FIG. 1) is given to the steering column 1 with impact from the steering wheel through the steering shaft 2. Then, with this load, in a part or the whole of the steering column 1, at least the portion thereof fixed to the raising/lowering bracket 15 is displaced forward. On the other hand, the supporting bracket 13 and the tilt adjusting bolt 18 remain supported on the car body 30 and are not displaced. Therefore, upon start of the displacement of the steering column 1, the tilt adjusting bolt 18 is displaced backward relatively to the steering column 1 (in reality, the tilt adjusting bolt 8 is not moved, but the steering column 1 is displaced forward). At the same time, the basic portion 17 of the energy absorbing member 16 is pulled forward by the latching plate 20 which is formed in the front end portion of the raising/lowering bracket 15.

When the basic portion 17 of the energy absorbing member 16 is pulled forward in this manner, the folded-back portions 19a, 19b which are formed in the deformable portions 18a, 18b of this energy absorbing member 16 are drawn or pulled against the tilt adjusting bolt 18 and the folded-back portions are shifted along the deformable portions, so that this energy absorbing member 16 is displaced. That is, upon the forward displacement of the steering column 1, the folded-back portions 19a, 19b are moved or shifted toward the tip ends of the deformable portions 18a, 18b from the portions at which they are originally formed. Since the energy absorbing member 16 is deformed in order to move the folded-back portions 19a, 19b to the tip ends of these deformable portions 18a, 18b in this manner, the shock energy applied on the steering wheel from the body of the driver upon said secondary collision is absorbed. As a result, the shock or impact applied on the body of the driver is mitigated, so as to protect the driver.

Especially, in the case of the steering column assembly of the shock absorbing type of the present invention, since the energy absorbing member 16 is formed by bending a metallic wire and the basic portion 17 of this energy absorbing member 16 is hooked or retained by the raising/lowering bracket 15 to be supported, the welding process for assembling the energy absorbing member 16 at a predetermined portion is no longer necessary. Also, since the energy absorbing member 16 is formed by bending the metallic wire, the material is hardly wasted, to improve a yield of the material. Also, since no complicated die is required to process the energy absorbing member 16, the manufacturing cost can be further reduced in this respect. Further, the process for aligning the cut-away portions 16a, 16b with the elongated holes 17a, 17b and the folded-back portions 19a, 19b in order to pass the tilt adjusting bolt 18 through these components in the assembling work can be carried out more easily. Therefore, the assembling work can be performed more efficiently.

Figure 4:
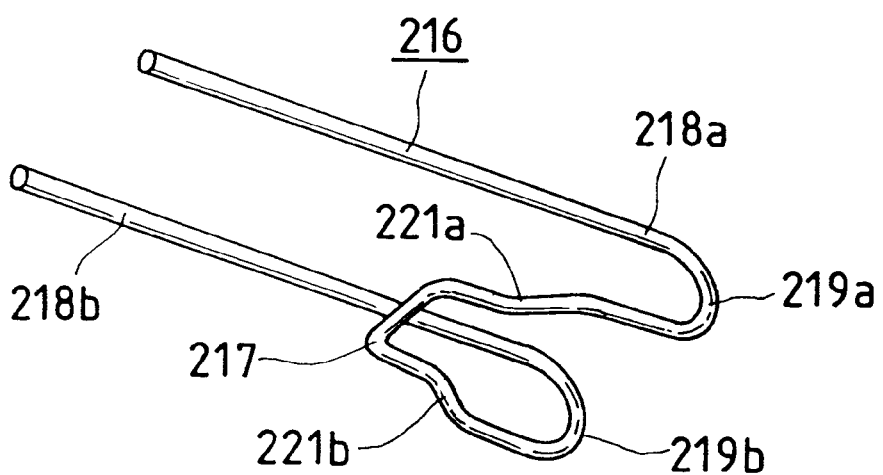
FIG. 4 is a perspective view of an energy absorbing member to be used in a second embodiment of the present invention.

Next, FIG. 4 shows another energy absorbing member 216 which has a slightly different configuration from that in the first embodiment, as the second embodiment of the present invention. In this second embodiment, slant portions 221a, 221b are formed between both of end portions of a basic portion 217 and a pair of deformable portions 218a, 218b. When the basic portion 217 is pulled forward at a secondary collision, these slant portions 221a, 221b are first extended and then folded-back portions 219a, 219b which are provided in the deformable portions 218a, 218b are drawn or pulled against the tilt adjusting bolt 18 (see FIGS. 1 and 2). Therefore, in this second embodiment, it is possible to reduce the load which is generated at the moment when the steering column 1 (FIGS. 1 and 2) starts to be displaced forward upon the secondary collision.

Figure 5:
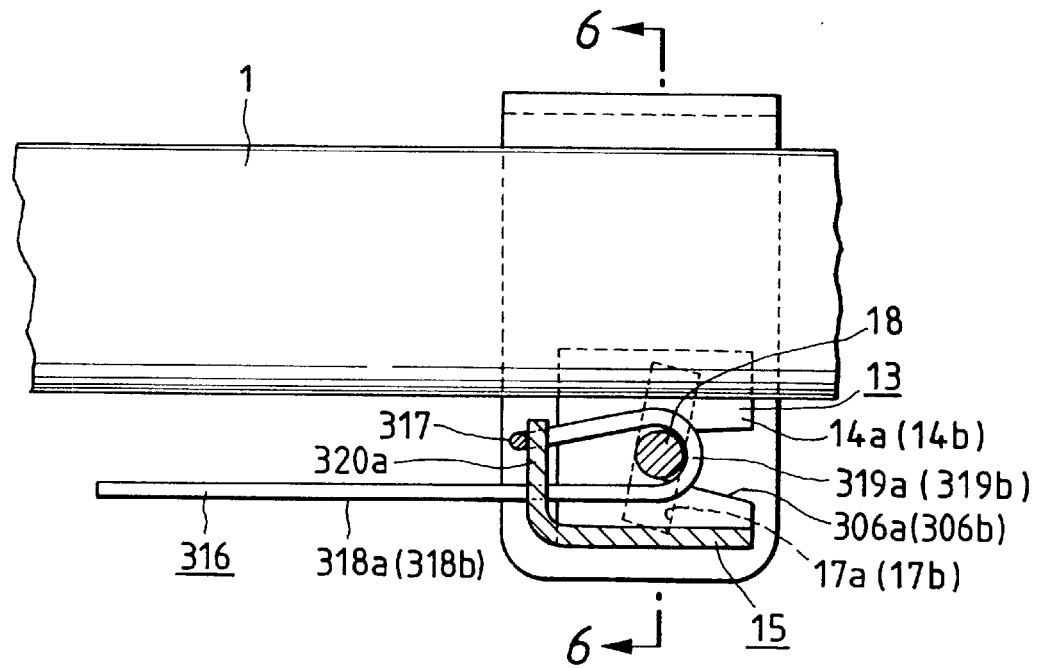
FIG. 5 is a partially cut-away side view for showing in cross-section a main portion of a third embodiment of the present invention.
Figure 6:
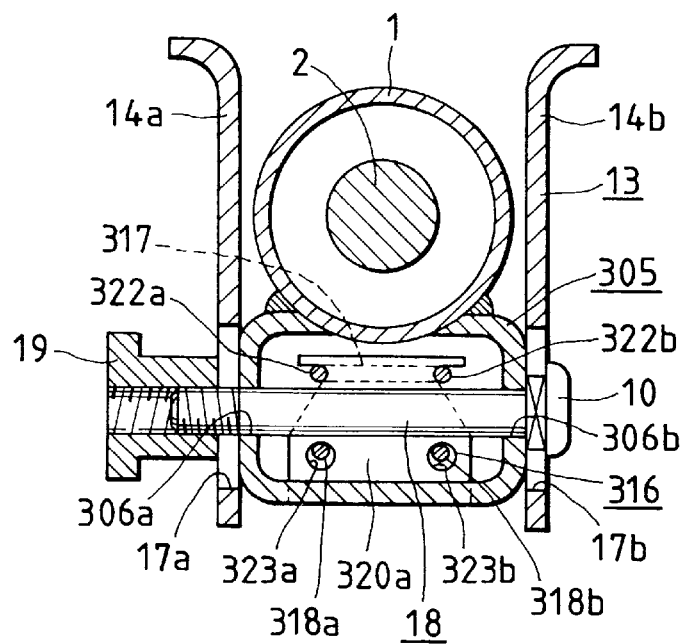
FIG. 6 is a view of said portion taken along 6—6 in FIG. 5.
Figure 7:
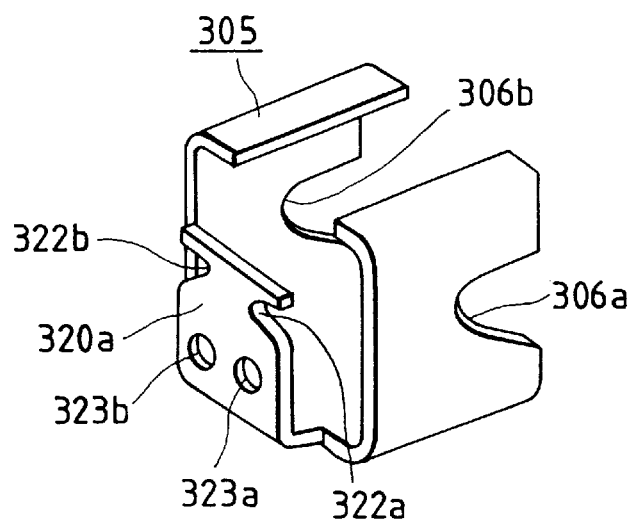
FIG. 7 is a perspective view of an raising/lowering bracket to be used in the third embodiment.

Next, FIGS. 5 to 7 show the third embodiment of the present invention. In this third embodiment, description of the same arrangements as those in the first embodiment will be omitted. In the third embodiment, an energy absorbing member 316 has the same configuration as that in FIG. 3, but is assembled upside down. In addition, in the third embodiment, a pair of latching cut-away portions 322a, 322b are formed on both right and left side edges of the upper end portion of a latching plate 320a which is formed on the front end edge (the left end edge in FIG. 5) of a raising/lowering bracket 305, and a pair of left and right small round holes 323a and 323b are formed beneath these latching cut-away portions 322a and 322b, respectively. Note that one elongated hole may be formed instead of these small round holes 323a, 323b, as in a form like these round holes 323a, 323b are made to be continuous. The energy absorbing member 316 is assembled into such latching plate 320a in a state that the basic portion 317 is latched by both latching cut-away portions 322a, 322b and a portion closer to the tip end than the folded-back portions 319a, 319b (the portion closer to the left sheet end in FIG. 5) is passed through the small round holes 323a, 323b in the middle portion of the pair of deformable portions 318a, 318b. Note that in the assembled state, the forms an d dimensions of the energy absorbing member 316 and the latching plate 320a are determined such that a part of the energy absorbing member 316 is elastically pressed against the peripheries of the latching cut-away portions 322a, 322b and the inner peripheries of the small round holes 323a, 323b. Therefore, no play is given to the energy absorbing member 316 with respect to the latching plate 320a after the assembling, and play noise is not generated in the assembled unit. Reference numbers 306a and 306b designate rearwardly open cut-away portions of the raising/lowering bracket 305.

Also in this third embodiment, with the same operations as in the first embodiment described above, the impact energy is absorbed while the folded-back portions 319a, 319b of the deformable portions 318a, 318b are moved toward the tip ends of these deformable portions 318a, 318b at the secondary collision. Especially beneficial, in the case of the third embodiment, since a part closer to the tip end than the folded-back portions 319a, 319b is made to pass through the above-mentioned small round holes 323a, 323b in the middle portions of the deformable portions 318a, 318b, an amount of winding (angle) of each of said folded-back portions 319a, 319b with respect to the middle portion of the tilt adjusting bolt 18 can be stably maintained after the commencement of the secondary collision. Therefore, the capability of absorbing energy at the secondary collision is stabilized.

Figure 8:
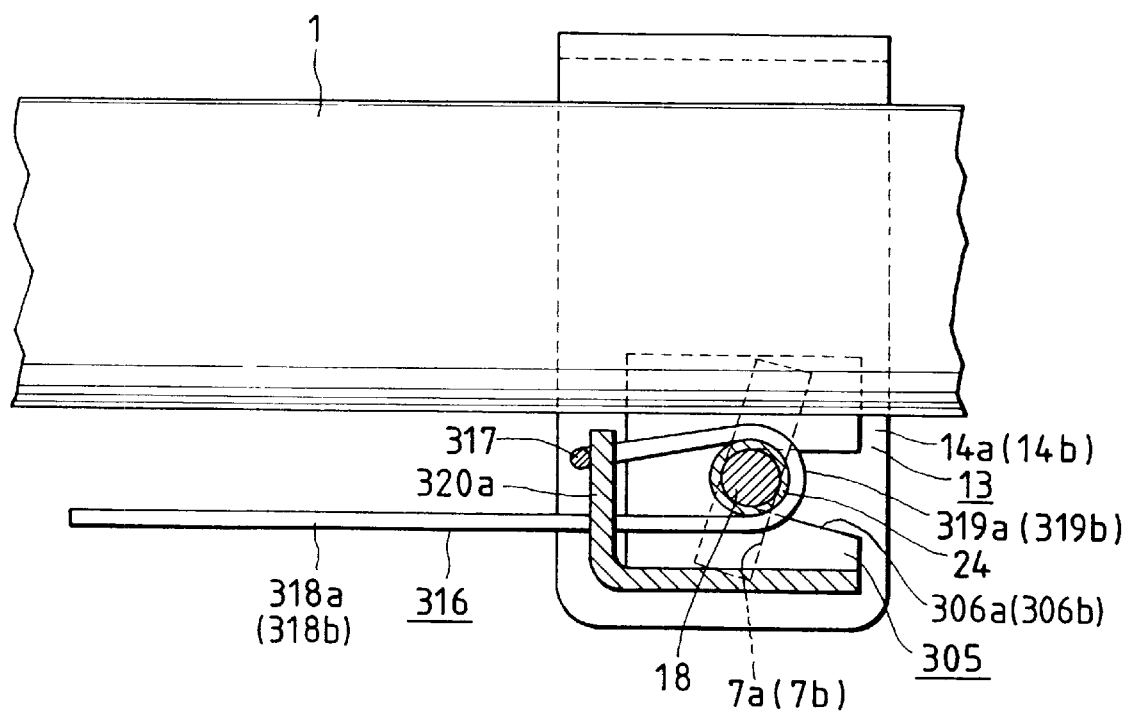
FIG. 8 is a partially cut-away side view for showing in cross-section a main portion of a fourth embodiment of the present invention.

Next, FIG. 8 shows the fourth embodiment of the present invention. In this fourth embodiment, a sleeve 24 which is made of metal, synthetic resin, or the like, in the form of a tube is fitted on the middle portion of the tilt adjusting bolt 18 rotatably, and the folded-back portions 319a, 319b of the energy absorbing member 316 pass around this sleeve 24. In the case of the fourth embodiment arranged as described above, sleeve 24 is rotated at the time of secondary collision, whereby the folded-back portions 319a, 319b are stably drawn against the sleeve or shifted. Other arrangements and operations in the fourth embodiment are the same to those in the third embodiment described before.

Figure 9:
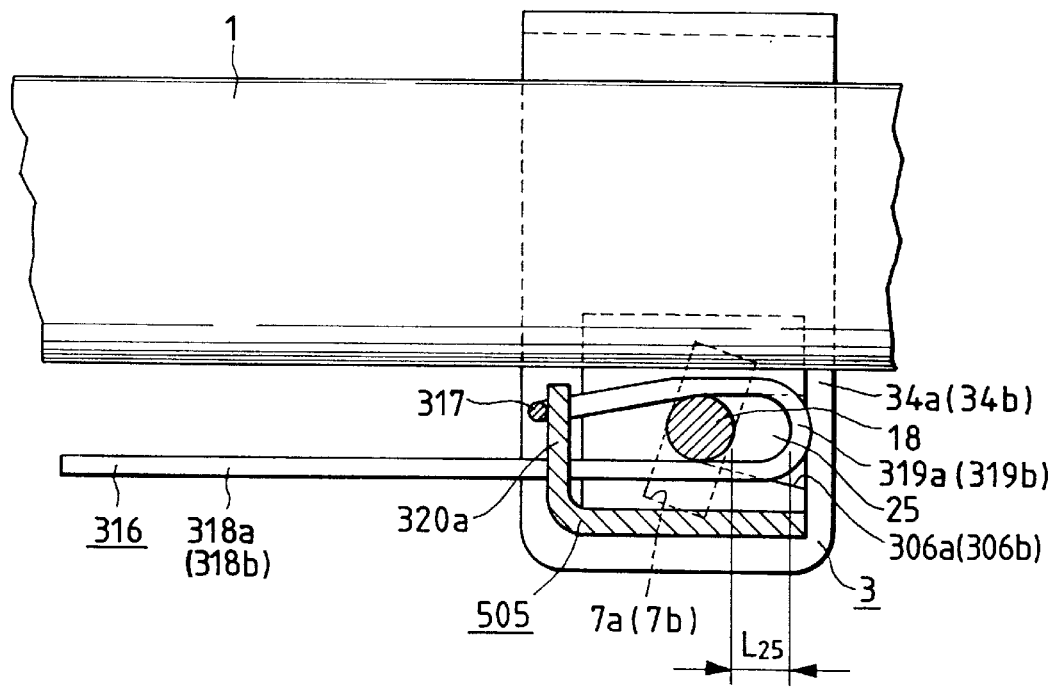
FIG. 9 is a partially cut-away side view for showing a main portion of a fifth embodiment of the present invention.

Next, FIG. 9 shows the fifth embodiment of the present invention. In this fifth embodiment, a gap 25 is interposed between the tilt adjusting bolt 18 and the folded-back portion 319a (319b). At the time of secondary collision, the steering column 1 is displaced forward by the length L25 of this gap 25 (to the left in FIG. 9), and then the folded-back portion 319a (319b) starts to be drawn or pulled against the tilt adjusting bolt 18. Since a resistance (the resistance of the static friction between the inner side faces of a supporting plate and the outer side faces of raising/lowering bracket 305) which is to be overcome when the steering column 1 starts to be displaced is comparatively large, no "drawing" or "pulling" of the turn-back portion 319a (319b) occurs due to the gap 25 immediately after the start of displacement of the steering column 1, whereby it is more easy to control a load of the steering column assembly of the shock absorbing type as a whole. Other arrangements and operations in this fifth embodiment are the same as those in the third embodiment described before.

Figure 10:
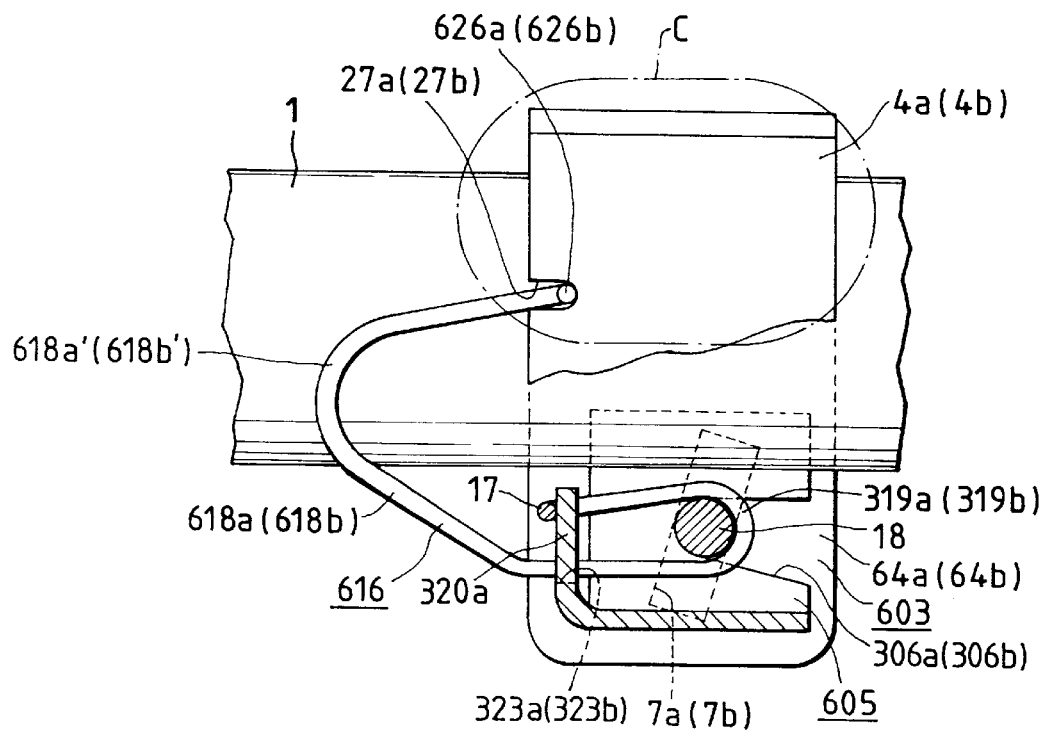
FIG. 10 is a partially cut-away side view for showing in cross-section a main portion of a sixth embodiment of the present invention.

Next, FIG. 10 shows the sixth embodiment of the present invention. In this sixth embodiment, a metallic wire for constituting an energy absorbing member 616 has elasticity and the tip ends of a pair of deformable portions 618a, 618a' (618b, 618b') of the energy absorbing member 616 are latched by a portion of a supporting bracket 603 as being freely detachable upon a secondary collision. That is, elasticity is given to each of the deformable portions 618a, 618a' (618b, 618b') in the direction in which the tip ends of the deformable portions are displaced downward (the direction in which the radius of curvature of each of the folded-back portions provided in the deformable portions 618a, 618a' (618b, 618b') is decreased). Tip latching portions 626a, 626b which are respectively formed by bending the tip ends of the deformable portions are latched by cut-away portions 27a, 27b which are formed at the front end edges (the left end edge in FIG. 10) of a pair of supporting plates 64a, 64b for constituting a supporting bracket 603. The latching portions 626a, 626b are thus latched by the cut-away portions 27a, 27b, and the deformable portions 618a, 618a' (618b, 618b') are provided between these cut-away portions 27a, 27b and the small round holes 323a, 323b of the latching plate 320a of the raising/lowering bracket 605, whereby the pair of right and left deformable portions 618a, 618b elastically support the weight of the steering column 1.

If it is so arranged that the weight of the steering column 1 be elastically supported by the elasticity of the energy absorbing member 616 as described above, a spring for supporting the weight of the steering column 1 is no longer required separately at the time of the tilt adjusting process for adjusting the height of the steering wheel. As a result, it is possible to reduce the cost further.

Figure 12:
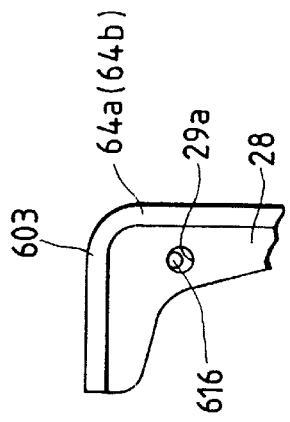
FIG. 12 is a view showing a part of said sixth embodiment, seen along the direction of the arrow 12 in FIG. 11.
Figure 11:
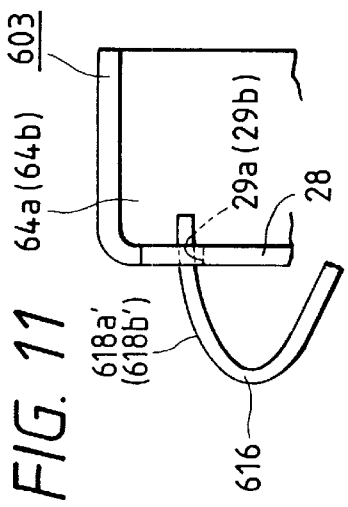
FIG. 11 is a view for showing a variation of the sixth embodiment, corresponding to the section C in FIG. 10.

Incidentally, in the case of this sixth embodiment, it is sufficient if the tip ends of the deformable portions 618a, 618a'; 618b, 618b' are latched as being detachable upon the secondary collision, and they are not always required to have such constitutions as shown in FIG. 10. For example, it is possible to form a small round hole 29a (29b) in a folded-back portion 28 if the folded-back portion 28 exists at the tip end edge of the supporting plate 64a or 64b of the supporting bracket 603 as being protruding sideward, as shown in FIGS. 11 to 12, and to insert the tip end of each of said deformable portions 618a, 618a'; 618b, 618b' through the corresponding small round hole 29a, 29b.

FIGS. 13 to 17 show the seventh embodiment of the present invention. When a strong impact load is given forward (to the left in FIGS. 13, 14 and 17) on the steering column 1 through the steering wheel (not shown) and the steering shaft 2, the steering column 1 can be freely displaced forward. A supported bracket 73 which is made by bending a steel plate having a sufficient rigidity is fixed by welding to a middle portion of said steering column 1. In the illustrated embodiment this supported bracket 73 has integrally an installing plate 74, a front bent plate portion 75 formed by bending the front end edge of the installing plate 74 in the middle portion downward, and a rear bent plate portion 76 formed by bending the central portion of the rear end edge of the installing plate 74 downward. A round hole 77 is formed on the central lower part of front bent plate portion 75, and a semi-circular cut-away portion 78 is formed on the lower edge of the rear bent plate portion 76, respectively. The radii of curvature of the round hole 77 and the cut-away portion 78 are substantially coincident with the radius of curvature of the outer periphery of the steering column 1. The supported bracket having such configuration is fixed to the outer periphery of the middle portion of this steering column by passing the steering column 1 through the round hole 77 and urging said cut-away portion 78 against the outer periphery of this steering column 1 and then by welding the inner peripheries of one round hole 77 and the cut-away portion 78 with the outer periphery of the steering column 1.

Figure 13:
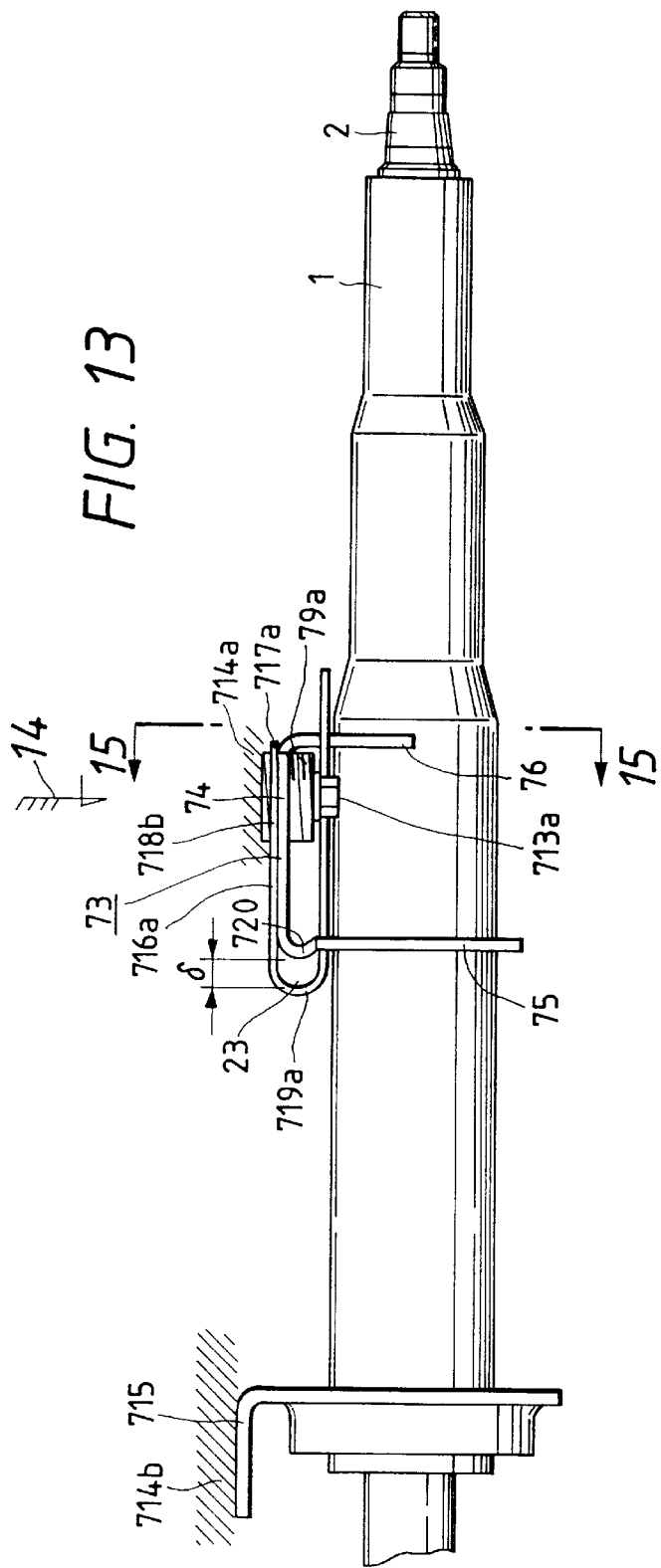
FIG. 13 is a lateral view for showing a seventh embodiment of the present invention, in a normal condition.
Figure 14:
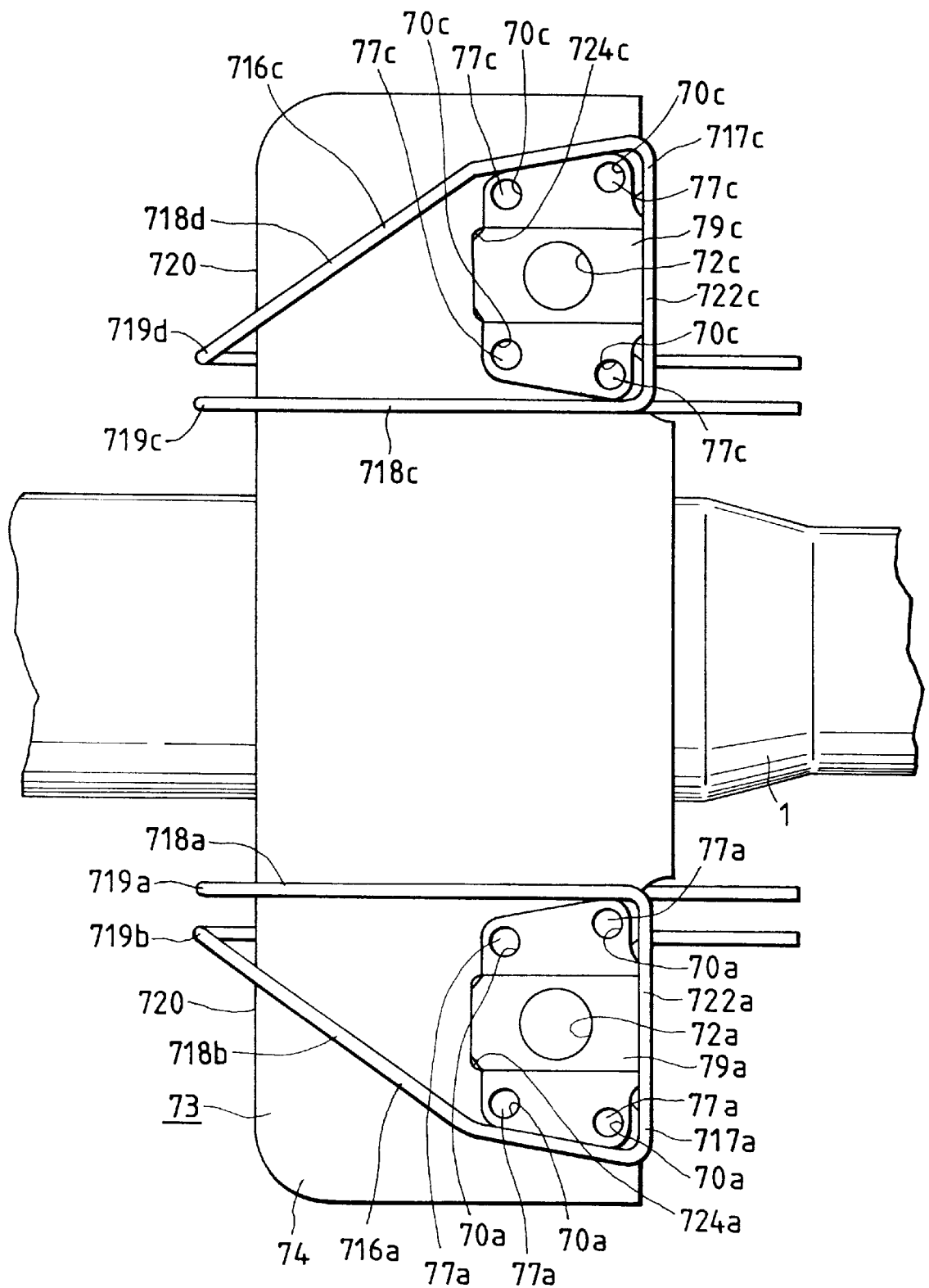
FIG. 14 is a view showing a part of said seventh embodiment, seen along the direction of the arrow 14 in FIG. 13.
Figure 17:
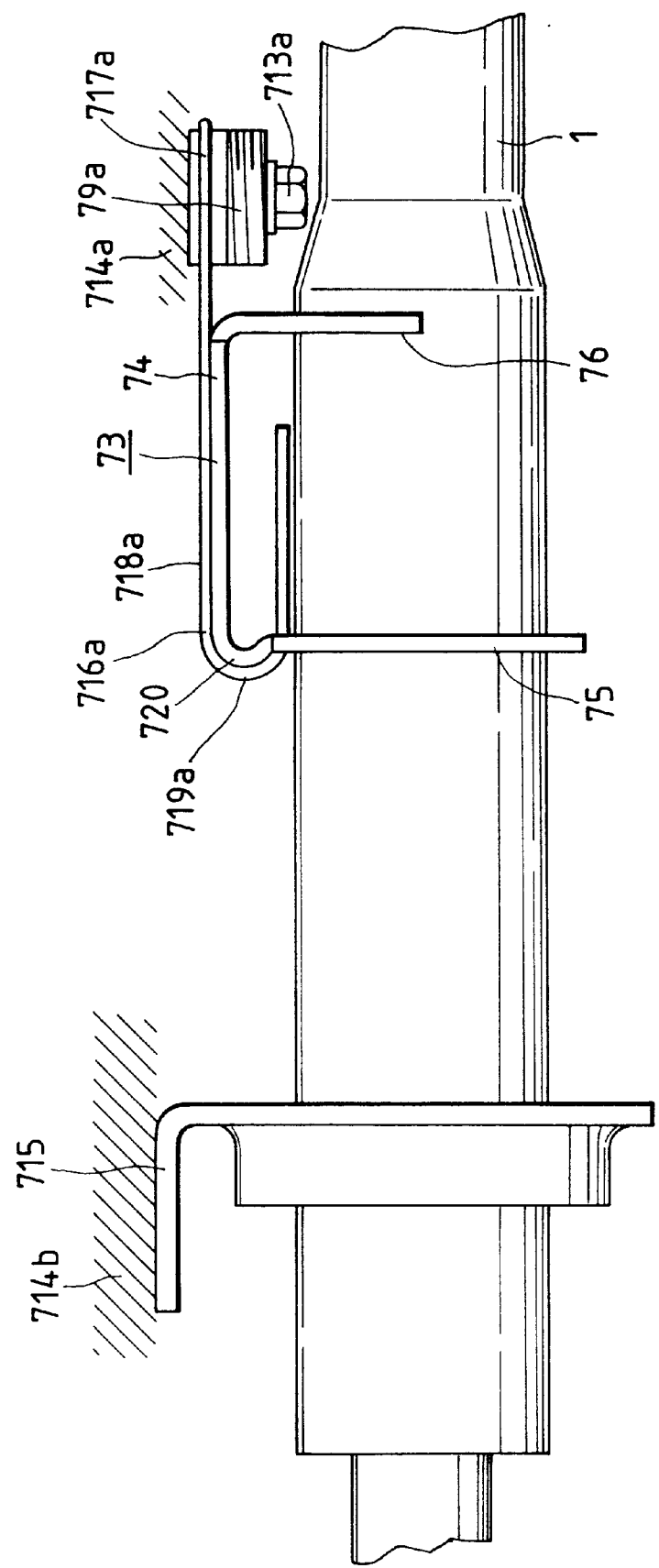
FIG. 17 is a side view showing the seventh embodiment of the present invention in a condition under the secondary collision.

Parts which are at both ends of installing plate 74 and protruding sideward more than rear bent plate portion 76 are, respectively, provided with cut-away portions 724a, 724c as being open toward the rear end edge of installing plate 74 (the right end edge side in FIGS. 13, 14 and 17). Then, latching members 79a, 79c are fixed to the inside of these cut-away portions 724a, 724c. These latching members 79a, 79c are made of light alloy or the like and are latched in such a manner that they are drawn out of the cut-away portions 724a, 724c when a large impact load is given onto the inside of the cut-away portions 724a, 724c. That is, while a plurality of small through-holes 70a, 70c which are respectively formed on both the right and left ends of these latching members 79a, 79c are aligned with small through-holes (not shown) which are formed on both sides of the cut-away portions 724a, 724c in parts of installing plate 74, synthetic resins 77a, 77c are filled between these small through-holes. The latching members 79a, 79c are not to be drawn from the cut-away portions 724a, 724c during a normal driving operation owing to the synthetic resins 77a, 77c. However, they are latched in such a manner that they can be drawn when a large impact load is given. Also, through-holes 72a, 72c are formed at the central portions of the respective latching members 79a, 79c, and the supported bracket 73 is supported by a portion 714a fixed to the car body with bolts 713a, 713c which are passed through these through-holes 72a, 72c upward. On the other hand, the front end portion of said steering column 1 is slidably supported by a front supporting bracket 715 which is supported by and fixed to a portion 714b fixed to the car body. Therefore, the steering column 1 is supported as can be displaced forward when a forward large impact load is applied to the car body.

Then, energy absorbing members 716a, 716c which are a feature of the present invention are provided between the supported bracket 73 and the latching members 79a, 79c, respectively. Each of the energy absorbing members 716a, 716c for constituting the steering column assembly of the shock absorbing type of the present embodiment is formed into a form shown in FIGS. 14 and 16, by plastically bending a metallic wire. These energy absorbing members 716a, 716c are provided on both sides of the steering column 1 substantially symmetrically.

Each of the energy absorbing members 716a, 716c is provided with a basic portion 717a or 717c and a pair of first and second deformable portions 718a, 718b or 718c, 718d which are integrally connected to or formed with the basic portion 717a or 717c. Each of the basic portions 717a, 717c is substantially formed into a U-shape, by bending forward both ends of a linear portion 722a or 722c at a right angle or an acute angle. The deformable portions 718a, 718b or 718c, 718d of each of the energy absorbing members 716a, 716c are formed into a J-shape as a whole by providing semi-arch folded-back portions 719a, 719b or 719c, 719d in the middle portions of the deformable portions 718a, 718b or 718c, 718d, respectively. Note that, in the illustrated embodiment, while one set of the deformable portions 718a, 718c, of each of the energy absorbing members 716a, 716c is provided at a right angle with respect to the linear portion 722a or 722c, the other of the deformable portions 718b, 718d are formed to make an acute angle with respect to the linear portion 722a or 722c. Thus, a distance between the folded-back portions 719a and 719b or 719c and 719d which are formed in the middle portions of the both deformable portions 718a, 718b or 718c, 718d of the energy absorbing member 716a or 716c is reduced and the tip ends of both deformable portions 718a, 718b or 718c, 718d are provided closer to the steering column 1 than the through-holes 72a or 72c. This arrangement, when the bolts 713a, 713c are passed through the through-holes 72a, 72c and fastened by a spanner or other tool, prevents interference of the tool with the other set of deformable portions 718b, 718d.

In order to realize an effective energy absorbing structure by combining with one pair of energy absorbing members 716a, 716c as mentioned above, a curved portion 720 is formed at the front end edge of supported bracket 73 and a pair of small through-holes 721a, 721c are formed on the right and left sides of front bent plate portion 75, respectively. That is, a cross-sectional shape of a portion at which the upper end edge of the front bent plate portion 75 is connected to the front end edge of the installing plate 74 is made in an arch shape which is a little smaller than the semi arch shape, whereby the curved portion 720 (see FIG. 13) which is protruding a little forward from the front side surface of the front bent plate portion 75 is formed on the front end edge of the supported bracket 73. Also, on the right and left sides of the front bent plate portion 75, there are provided the small through-holes 721a, 721c which are capable of inserting through parts of the deformable portions 718a, 718b or 718c, 718d for constituting said energy absorbing member 716a or 716c, closer to the tip end than said folded-back portions 719a, 719b; 719c, 719d, respectively.

Figure 15:
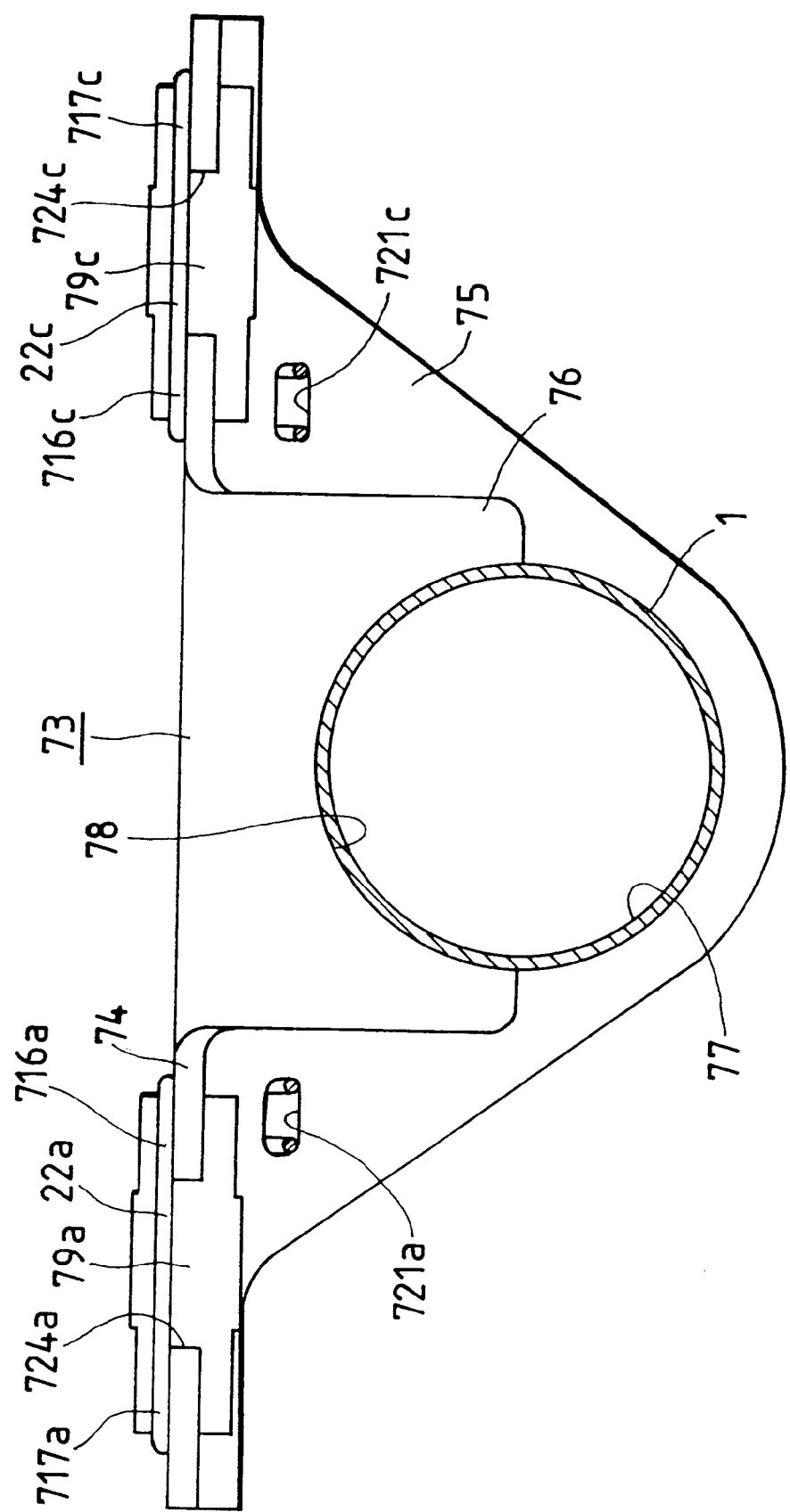
FIG. 15 is an enlarged cross-sectional view of the embodiment in FIG. 13, taken along 15—15 in FIG. 13.
Figure 16:
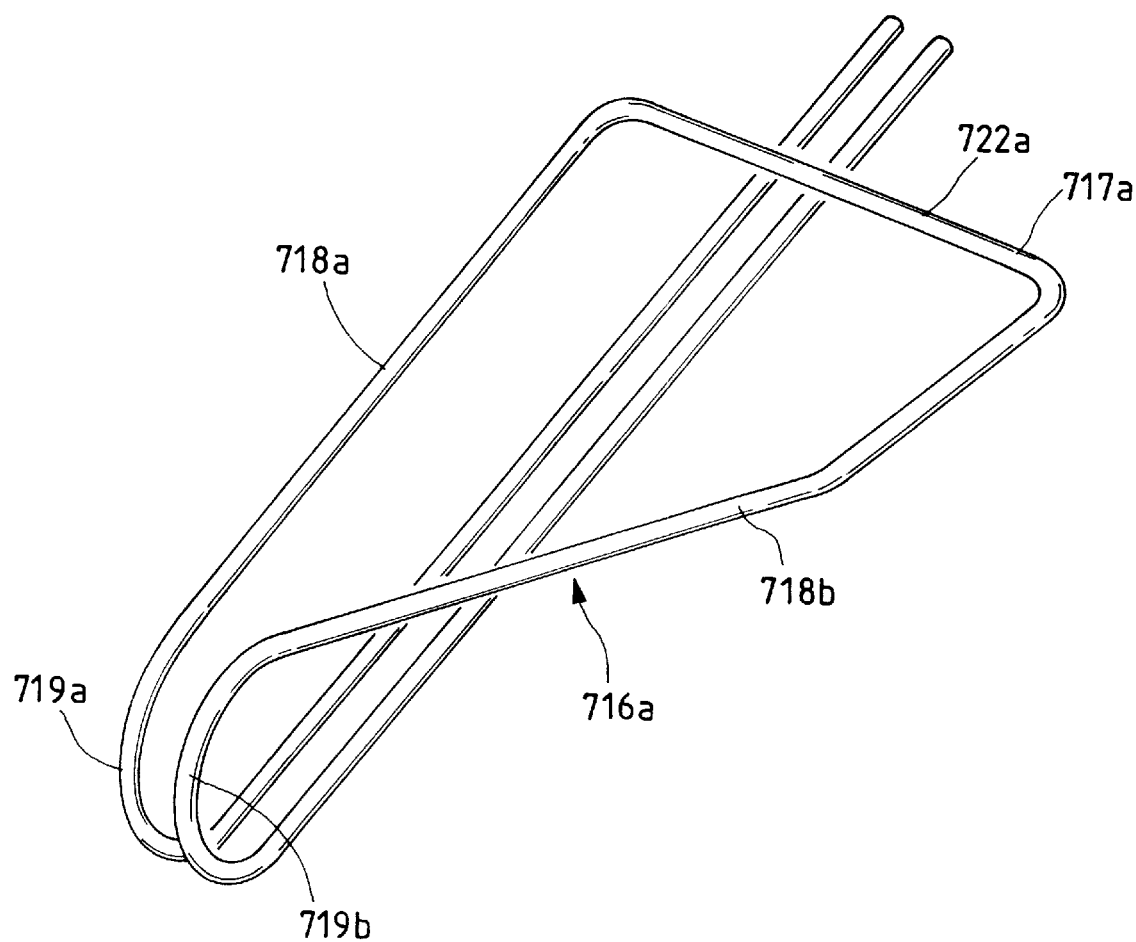
FIG. 16 is a perspective view of an energy absorbing member to be used in the seventh embodiment.

A process for constituting the steering assembly of the shock absorbing type of the present invention, by combining the supported bracket 73 with the energy absorbing members 716a, 716c structured as described above, is carried out as described below. First, the tip ends of the deformable portions 718a, 718b; 718c, 718d for constituting said energy absorbing members 716a, 716c are inserted into the small through-holes 721a, 721c, respectively. Then, as shown in FIGS. 13 to 15, the basic portion 717a or 717c of the energy absorbing member 716a or 716c is fitted on a portion which is part of each of the latching members 79a, 79c and is protruding from the upper surface of the installing plate 74. While this state continues, the linear portion 722a or 722c for constituting the basic portion 717a or 717c is abutted upon or opposed to the rear end surface of the latching member 79a or 79c. As described above, a process for mounting the energy absorbing members 716a, 716c onto the supported bracket 73 can be carried out easily and in a short time by utilizing the elasticity of these energy absorbing members 716a, 716c. When these energy absorbing members 716a, 716c are mounted onto the supported bracket 73 in this manner, the bolts 713a, 713c are inserted into the through-holes 72a, 72c of the latching members 79a, 79c, and these bolts 713a, 713c are threadably engaged with tapped holes provided in the fixed portion 714a to the car body, and are fastened further.

The steering assembly of the shock absorbing type of the present invention which is assembled as described above is operated in the following manner so as to protect the driver at an accidental collision. At a secondary collision, a load is applied frontward (to the left in FIGS. 13 and 14) with impact onto the steering column 1 from the steering wheel through the steering shaft 2. With this load, the steering column 1 is displaced forward together with the supported bracket 73. On the other hand, the latching members 79a, 79c remain to be supported on the portion 714a fixed to the car body together with the bolts 713a and 713c and are not displaced. Therefore, upon start of the displacement of the steering column 1, the supported bracket 73 is displaced forward with respect to each of the latching members 79a, 79c. Then, after the supported bracket 73 is displaced forward by the dimension δ of a gap 23 which is provided between the curved portion 720 and the folded-back portions 719a, 719b; 719c, 719d (see FIG. 13), the folded-back portions 719a, 719b; 719c, 719d which are formed in the middle portions of the deformable portions 718a, 718b; 718c, 718d of the respective energy absorbing members 716a, 716c are pulled forward by the curved portion 720.

When the folded-back portions 719a, 719b; 719c, 719d of the energy absorbing members 716a, 716c are pulled forward in this manner, these folded-back portions are drawn or pushed by the curved portion 720 so that these energy absorbing members 716a, 716c are deformed. That is, upon the forward displacement of said steering column 1, the folded-back portions 719a, 719b; 719c, 719d are moved toward the tip ends of these deformable portions 718a, 718b; 718c, 718d from the portions at which they are originally positioned. Since the energy absorbing members 716a, 716c are deformable so as to move the folded-back portions 719a, 719b; 719c, 719d toward the tip ends of these deformable portions 718a, 718b; 718c, 718d as described above, the impact energy which is applied on the steering wheel from the body of the driver upon the secondary collision can be absorbed. As a result, the impact given to the body of the driver is mitigated so as to protect the driver at the time of secondary collision.

Especially, in the steering column assembly of the shock absorbing type according to the present embodiment, since the energy absorbing members 716a, 716c are formed by bending metallic wire and the basic portions 717a, 717c of these energy absorbing members 716a, 716b are fitted on and retained by the latching members 79a, 79d, the welding process for assembling these energy absorbing members 716a, 716c at predetermined portions is no longer necessary. Also, since the energy absorbing members 716a, 716c are formed by bending the metallic wire, the material is hardly wasted so as to improve a yield of the material. Also, no complicated die is required for processing the energy absorbing members 716a, 716c, so manufacturing cost can be reduced in this respect. Further, the assembling work can be easier. Therefore, the efficiency of the assembling work can be improved.

It should be noted that the reason for providing the gap 23 between the curved portion 720 and each of the folded-back portions 719a, 719b; 719c, 719d is to reduce the impact load to be applied onto the body of the driver upon the secondary collision as much as possible. That is, a force for breaking the synthetic resins 77a, 77b and a force for starting the displacement of the installing plate 74 to resist the static friction acting between each of the latching members 79a, 79c and the installing plate 74 are required for displacing the steering column 1 forward upon the secondary collision. These forces are applied only at the moment of start of the secondary collision. However, if the "shifting" or "pushing" of said folded-back portions 719a, 719b; 719c, 719d is started at the moment when these forces are applied, the impact given onto the body of the driver at that moment becomes larger correspondingly. By by providing the gap 23, it is arranged not to start the "shifting" or "pushing" of the folded-back portions 719a, 719b; 719c, 719d at the moment when the secondary collision starts. However, if the force required for displacing the steering column 1 forward is small, the curved portion 720 may be brought into tight contact with the folded-back portions 719a, 719b; 719c, 719d in a normal condition.

Figure 18:
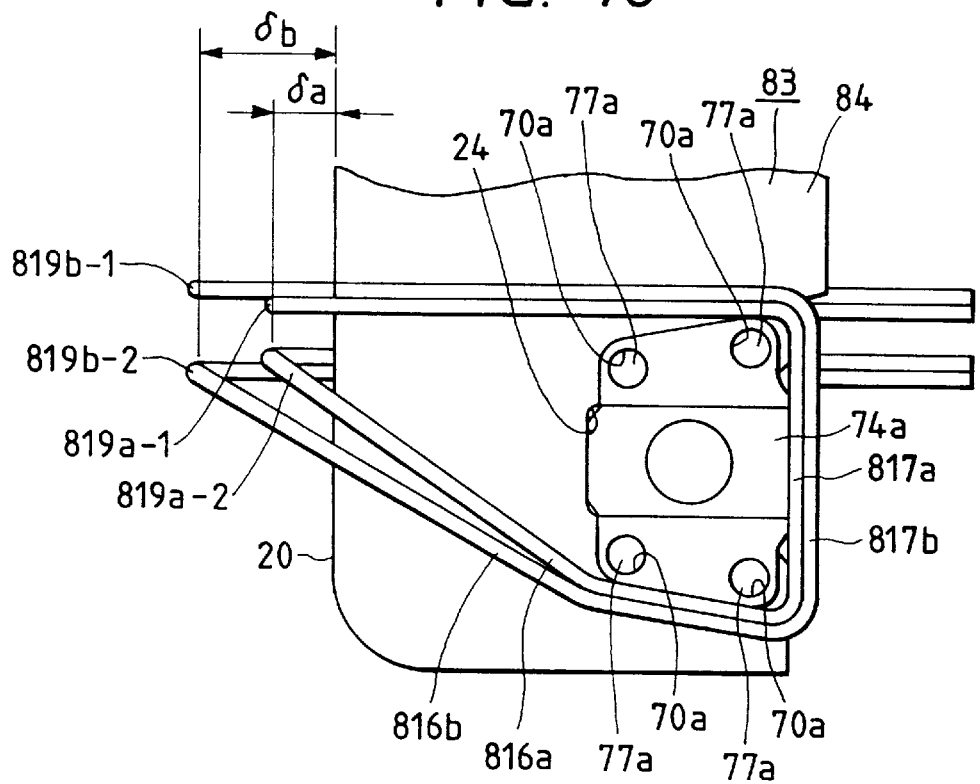
FIG. 18 is a view for showing an eighth embodiment, corresponding to a lower section of FIG. 14.
Figure 19:
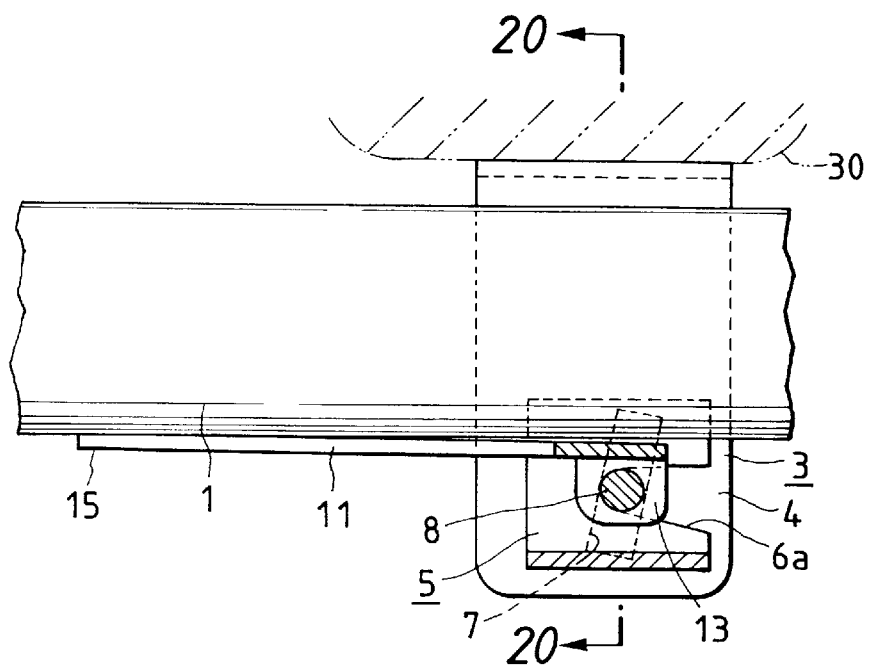
FIG. 19 is a cut-away side view for showing in cross-section a main portion of a conventional steering column apparatus of a shock absorbing type.
Figure 20:
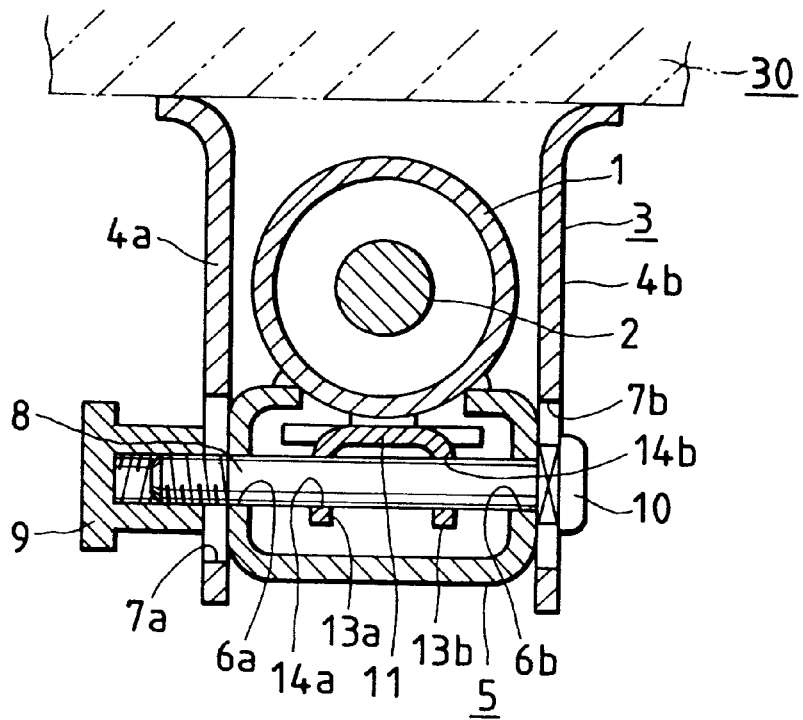
FIG. 20 is a cross-sectional view of the apparatus in FIG. 19, taken along 20—20.
Figure 21:
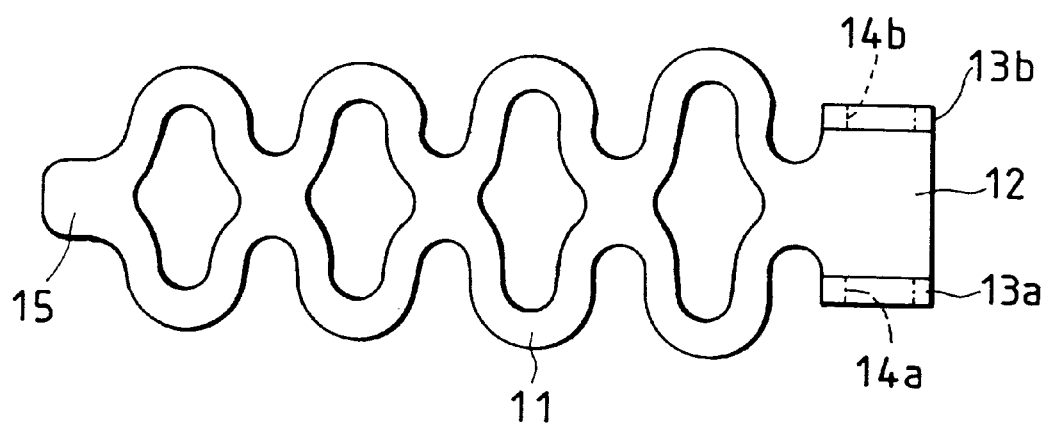
FIG. 21 is a plan view of the energy absorbing member of the apparatus of FIGS. 19 and 20.

Next, FIG. 18 shows the eighth embodiment of the present invention. In this eighth embodiment, a pair of energy absorbing members 816a, 816b or 816c, 816d having different dimensions from each other are provided in the right and left end potions of an installing plate 84 of a supported bracket 83. Since the energy absorbing members 816a, 816b, have symmetrical structures to the energy absorbing members 816c, 816d, detailed description thereof will be omitted below. Then, it is arranged that a distance δa from each of folded-back portions 819a-1, 819a-2 formed on one energy absorbing member 816a to a curved portion 820 formed at the front end edge of the installing plate 84 should be different from a distance δb from each of folded-back portions 819b-1, 819b-2 formed on the other energy absorbing member 816b to the curved portion 820 at the front end edge of the installing plate 84. In this eighth embodiment in which the energy absorbing members 816a, 816b having different dimensions from each other are provided in parallel, at the time of a secondary collision, after the "shifting" or "drawing" of the folded-back portions 819a-1, 819a-2 of one energy absorbing member 816a is started, the "shifting" or "drawing" of the folded-back portions 819b-1, 819b-2 of the other energy absorbing member 816b is started. Therefore, in this embodiment, it is possible to adjust the energy absorbing property of these energy absorbing members 816a, 816b at the time of the secondary collision. Such adjustment of the energy absorbing property can be carried out arbitrarily and very easily by changing the positions of the folded-back portions 819a-1, 819a-2; 819b-1, 819b-2 or changing the linear diameters of both of the energy absorbing members 816a, 816b.

Since the steering column assembly of the shock absorbing type according to the present invention is constituted and operated as described above, a structure for this apparatus which is capable of mitigating an impact at a secondary collision to protect the driver effectively can be obtained at low cost.

What is claimed is:

1. A shock absorbing steering column assembly, comprising:

a first bracket fixed to a steering column at an intermediate portion of the steering column;

a second bracket fixed to a vehicle body for supporting said first bracket;

a connecting device including a bolt and a nut which are fastened to support the first bracket to the second bracket until a predetermined impact load is applied on the steering column upon a secondary collision, said connecting device allowing the first bracket to move forward with respect to the second bracket when said predetermined impact load is applied on the steering column; and an energy absorbing member constructed and disposed to absorb secondary-collision energy when said first bracket moves forward with respect to said second bracket;

wherein said energy absorbing member includes a metallic wire; said metallic wire has a basic portion and opposed elongated deformable portions integrally extended from respective ends of said basic portion; said elongated deformable portions have respective folded-back portions and respective deformable portions extending from said folded-back portions to respective end portions of said elongated deformable portions; and said energy absorbing member is retained at said basic portion by said first bracket and is adapted to engage with said bolt at said folded-back portions, such that when said first bracket moves forward with respect to said second bracket upon the secondary collision, said metallic wire is urged by said first bracket to force said folded-back portions against a surface on said bolt so as to shift said folded-back portions along the elongated deformable portions toward said end portions thereof, thereby absorbing secondary-collision energy.

2. A shock absorbing steering column assembly according to claim 1, wherein said surface on said bolt is a surface of said bolt.

3. A shock absorbing steering column assembly according to claim 1, wherein said surface on said bolt is a surface of a sleeve fitted on said bolt.

4. A shock absorbing steering column assembly comprising:

a first bracket fixed to an intermediate portion of a steering column and oriented transversely to a longitudinal axis of the steering column, the first bracket having a pair of opposed side walls each formed with a cut-away portion opened rearward;

a second bracket having a pair of supporting plates for laterally sandwiching said opposed side walls of the first bracket therebetween, said second bracket being fixed to a vehicle body, and the supporting plates being formed with through-holes opposed to said cut-away portions of the first bracket;

a connecting device for connecting and supporting said first bracket to said second bracket, said connecting device including a bolt extending through said cut-away portions of said first bracket and said through-holes of said second bracket and a nut fastened to said bolt to support said first bracket to said second bracket until a predetermined impact load is applied on the steering column upon a secondary collision, said connecting device allowing said first bracket to move with respect to said second bracket upon the secondary collision; and an energy absorbing member provided between said first bracket and said second bracket;

wherein said energy absorbing member includes a metallic wire having a basic portion and a deformable portion integrally formed by bending the wire; said basic portion is connected to and supported by a part of said first bracket in front of said bolt; and said deformable portion has a folded-back portion passing around a rear face of said bolt.

5. A shock absorbing steering column assembly comprising:

a first bracket fixed to an intermediate portion of a steering column and oriented transversely to a longitudinal axis of the steering column;

a latching member for latching the first bracket to a fixing portion fixed to a vehicle body, the latching member being fixed to said fixing portion and allowing the first bracket to move forward relative to the latching member when a forward impact load greater than a predetermined amount is applied on said steering column upon a secondary collision; and an energy absorbing member provided between said fixing portion and said first bracket, said energy absorbing member including a metallic wire having a basic portion and a deformable portion integrally formed by bending the wire from said basic portion, said basic portion being restrained against forward movement by said latching member, and said deformable portion having a folded-back portion folded back in front of a front end edge of said first bracket, such that when said first bracket moves forward upon the secondary collision, the folded-back portion of said wire is shifted by the front end edge of said first bracket to absorb secondary-collision energy.

6. A shock absorbing steering column assembly according to claim 5, wherein said basic portion is constituted by an intermediate section of said wire, said deformable portion is constituted by sections of said wire extending from respective ends of said intermediate section, and said folded-back portion is constituted by parts of said extending sections folded-back in front of said front end edge of said first bracket.

7. A shock absorbing steering column assembly according to claim 6, wherein a part of one of said extending sections between said basic portion and said folded-back portion is disposed at an acute angle relative to a part of the other of said extending sections between said basic portion and said folded-back portion.

8. A shock absorbing steering column assembly comprising:

a first bracket fixed to an intermediate portion of a steering column and oriented transversely to a longitudinal axis of the steering column, the first bracket having a pair of opposed side walls each formed with a cut-away portion opening rearward;

a second bracket having a pair of supporting plates for laterally sandwiching said opposed side walls of the first bracket therebetween, the supporting plates being formed with through-holes opposed to said cut-away portions of the first bracket;

a connecting device for connecting and supporting said first bracket to said second bracket, said connecting device including a bolt extended through said cut-away portions of said first bracket and said through-holes of said second bracket and a nut fastened to said bolt so that said first bracket is supported to said second bracket until a predetermined impact load is applied to the steering column upon a secondary collision, said connecting device allowing said first bracket to move with respect to said second bracket to permit energy to be absorbed upon the secondary collision; and an energy absorbing member provided between said first bracket and said second bracket to absorb said energy when said first bracket moves with respect to said second bracket;

wherein said energy absorbing member includes a metallic wire having a basic portion and a deformable portion integrally formed by bending the wire; said basic portion is connected to and supported by a part of said first bracket in front of said bolt; and said deformable portion is extended rearward from said part of said first bracket toward said bolt, is folded back around said bolt, and is extended forward, such that when said first bracket moves with respect to said second bracket, said metallic wire is drawn by said first bracket against a surface on said bolt so as to absorb secondary-collision energy.

9. A shock absorbing steering column assembly according to claim 8, wherein said surface on said bolt is a surface of said bolt.

10. A shock absorbing steering column assembly according to claim 8, wherein said surface on said bolt is a surface of a sleeve fitted on said bolt.

11. A shock absorbing steering column assembly, comprising:

a first bracket fixed to a steering column;

a second bracket fixed to a vehicle body and having a wall portion facing a wall portion of said first bracket;

a connecting device fixing said first bracket to said second bracket and including a connecting member extending through open portions of said wall portions of said first bracket and said second bracket, said connecting device and said open portions being constructed to allow said first bracket to move forward with said steering column relative to said second bracket in response to an impact force on said steering column; and a deformable energy absorbing member having a first portion connected to said first bracket for forward movement therewith and a second portion, including a folded-back portion, embracing said connecting member such that the forward movement of said steering column causes said energy absorbing member to be drawn against a surface on said connecting member so as to deform said energy absorbing member and thereby absorb impact energy.

12. A shock absorbing steering column assembly according to claim 11, wherein said connecting member includes a shaft member.

13. A shock absorbing steering column assembly according to claim 12, wherein said surface on said connecting member is a surface of said shaft member.

14. A shock absorbing steering column assembly according to claim 12, wherein said surface on said connecting member is a surface of a sleeve fitted on said shaft member.

15. A shock absorbing steering column assembly according to claim 12, wherein said shaft member is a bolt and said connecting device includes a nut threaded on said bolt, said bolt and said nut being cooperative to clamp said first bracket to said second bracket.

16. A shock absorbing steering column assembly according to claim 15, wherein said steering column is tilt-adjustable, and one of said nut and said bolt is cooperative with a tilt adjustment member to loosen a clamping force of said nut and said bolt and thereby release said first bracket from said second bracket to allow tilt adjustment of said steering column.

17. A shock absorbing steering column assembly according to claim 16, wherein said energy absorbing member has a portion connected to said second bracket such that said energy absorbing member supports weight of said steering column when said first bracket is released from said second bracket to allow tilt adjustment of said steering column.

18. A shock absorbing steering column assembly according to claim 11, wherein said energy absorbing member is an elongate member, said first portion is an intermediate portion of said elongate member, and said second position includes a pair extension portions extending from respective ends of said intermediate portion, each of said extension portions having a folded-back portion and embracing said connecting member such that the forward movement of said steering column causes said extension portions to be drawn against said surface on said connecting member so as to deform said extension portions and absorb impact energy.

19. A shock absorbing steering column assembly according to claim 11, wherein said steering column is tilt-adjustable, and said connecting device is cooperative with a tilt adjustment member to release said first bracket from said second bracket to allow tilt adjustment of said steering column.

20. A shock absorbing steering column assembly according to claim 19, wherein said energy absorbing member has a portion connected to said second bracket such that said energy absorbing member supports weight of said steering column when said first bracket is released from said second bracket to allow tilt adjustment of said steering column.

* * * * *